(12) United States Patent
Takahashi et al.

(10) Patent No.: US 9,465,275 B2
(45) Date of Patent: Oct. 11, 2016

(54) IMAGING DEVICE AND FOCAL PLANE SHUTTER

(71) Applicant: SEIKO PRECISION INC., Narashino-shi (JP)

(72) Inventors: Hiroshi Takahashi, Narashino (JP); Minori Murata, Narashino (JP); Seiichi Oishi, Narashino (JP); Shoichi Tokura, Narashino (JP)

(73) Assignee: SEIKO PRECISION INC., Narashino-shi (JP)

( * ) Notice: Subject to any disclaimer, the term of this patent is extended or adjusted under 35 U.S.C. 154(b) by 0 days.

(21) Appl. No.: 14/695,568

(22) Filed: Apr. 24, 2015

(65) Prior Publication Data

US 2015/0227020 A1    Aug. 13, 2015

Related U.S. Application Data

(63) Continuation of application No. PCT/JP2014/051286, filed on Jan. 22, 2014.

(30) Foreign Application Priority Data

Mar. 28, 2013   (JP) ................................ 2013-070419

(51) Int. Cl.
   *G03B 9/40*   (2006.01)
   *G03B 9/08*   (2006.01)
   *G03B 9/42*   (2006.01)
   *H04N 5/225*  (2006.01)
   *H04N 5/235*  (2006.01)

(52) U.S. Cl.
   CPC . *G03B 9/40* (2013.01); *G03B 9/08* (2013.01); *G03B 9/42* (2013.01); *H04N 5/2254* (2013.01); *H04N 5/2353* (2013.01)

(58) Field of Classification Search
   CPC ............................ H04N 5/2353; H04N 5/238
   See application file for complete search history.

(56) References Cited

U.S. PATENT DOCUMENTS

| 2003/0012573 | A1  | 1/2003 | Sekizawa |
| 2006/0078330 | A1* | 4/2006 | Noto ................... H04N 5/2254 396/452 |
| 2014/0248046 | A1  | 9/2014 | Takahashi |

FOREIGN PATENT DOCUMENTS

| JP | 2003-5252 A1   | 1/2003 |
| JP | 2013-145361 A1 | 7/2013 |

(Continued)

OTHER PUBLICATIONS

International Search Report for International Application No. PCT/JP2014/051286 dated Apr. 28, 2014.

(Continued)

*Primary Examiner* — Tuan Ho
(74) *Attorney, Agent, or Firm* — Kratz, Quintos & Hanson, LLP

(57) ABSTRACT

An imaging device includes: a focal plane shutter including: a board including an opening; a leading shutter and a trailing shutter opening and closing the opening; a leading shutter actuator and a trailing shutter actuator respectively driving the leading shutter and the trailing shutter; and a restrict portion that restricts reciprocating movement ranges of the leading shutter and the trailing shutter, an image pickup element which light enters through the opening; and a drive control portion.

6 Claims, 9 Drawing Sheets

(56) References Cited

FOREIGN PATENT DOCUMENTS

| | | |
|---|---|---|
| JP | 3176166 U | 6/2014 |
| WO | WO02/43227 A1 | 5/2002 |

OTHER PUBLICATIONS

Office Action of counterpart Japanese Patent Application No. 2013-070419 issued on Jun. 28, 2016, with English translation.

* cited by examiner

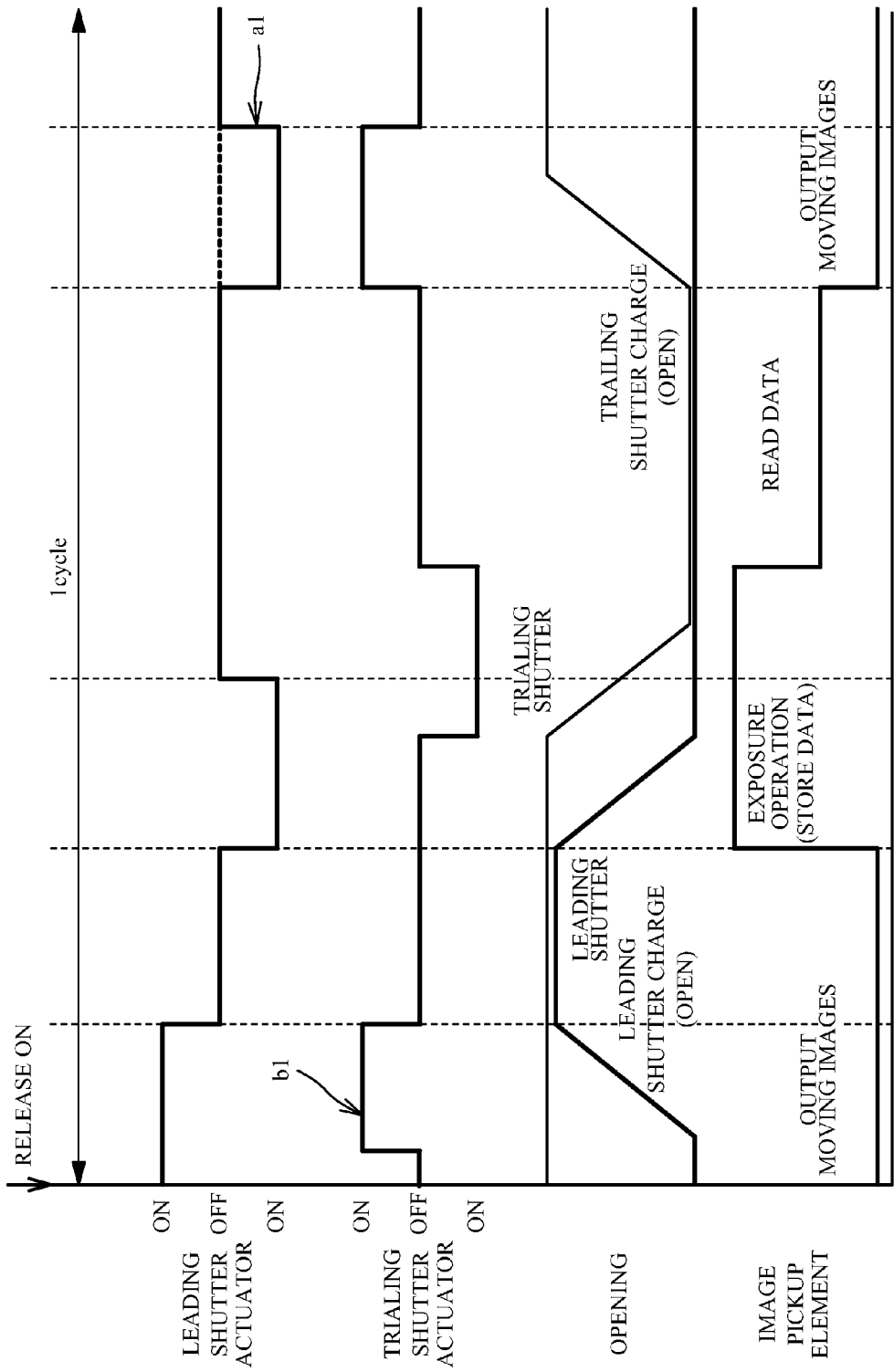

US 9,465,275 B2

IMAGING DEVICE AND FOCAL PLANE SHUTTER

CROSS-REFERENCE TO RELATED APPLICATION

This application is a continuation of and claims priority to International Patent Application No. PCT/JP2014/051286 filed on Jan. 22, 2014, which claims priority to Japanese Patent Application No. 2013-070419 filed on Mar. 28, 2013, subject matter of these patent documents is incorporated by reference herein in its entirety.

BACKGROUND (i) Technical Field

The present invention relates to imaging devices and focal plane shutters.

(ii) Related Art

Japanese Utility Model No. 3176166 discloses a focal plane shutter that includes a leading shutter actuator and a trailing shutter actuator respectively driving a leading shutter and a trailing shutter.

The energization of the actuator increases the heat generation amount of a coil of the actuator to increase its temperature. This results in an increase in a resistance value of the coil, which delays rise of a drive current value.

Thus, for example, in a case of a large difference in the energization period, in the coil resistance value, in the applied current value, in the applied voltage value, or the like between the leading shutter actuator and the trailing shutter actuator, a difference between both actuators in the heat generation amount is also increased. Thus, the continuous use also increases a difference in the temperature between the coils of the leading shutter actuator and the trailing shutter actuator. This increases a difference in the rotational speed between the leading shutter actuator and the trailing shutter actuator, which leads to a large difference between in the moving speed between the leading shutter and the trailing shutter. This might influence image quality.

SUMMARY

According to an aspect of the present invention, there is provided an imaging device including: a focal plane shutter including: a board including an opening; a leading shutter and a trailing shutter opening and closing the opening; a leading shutter actuator and a trailing shutter actuator respectively driving the leading shutter and the trailing shutter; and a restrict portion that restricts reciprocating movement ranges of the leading shutter and the trailing shutter, an image pickup element which light enters through the opening; and a drive control portion that additionally energizes one of the leading shutter actuator and the trailing shutter actuator such that one of the leading shutter and the trailing shutter tries to move in a direction when the restriction portion restricts the one of the leading shutter and the trailing shutter from moving in the direction, to suppress a difference in heat generation amount between the leading shutter actuator and the trailing shutter actuator during a shooting operation period for shooting a single image.

BRIEF DESCRIPTION OF THE DRAWINGS

FIG. 4 is a timing chart of the focal plane shutter;

DETAILED DESCRIPTION

Figure 1A:
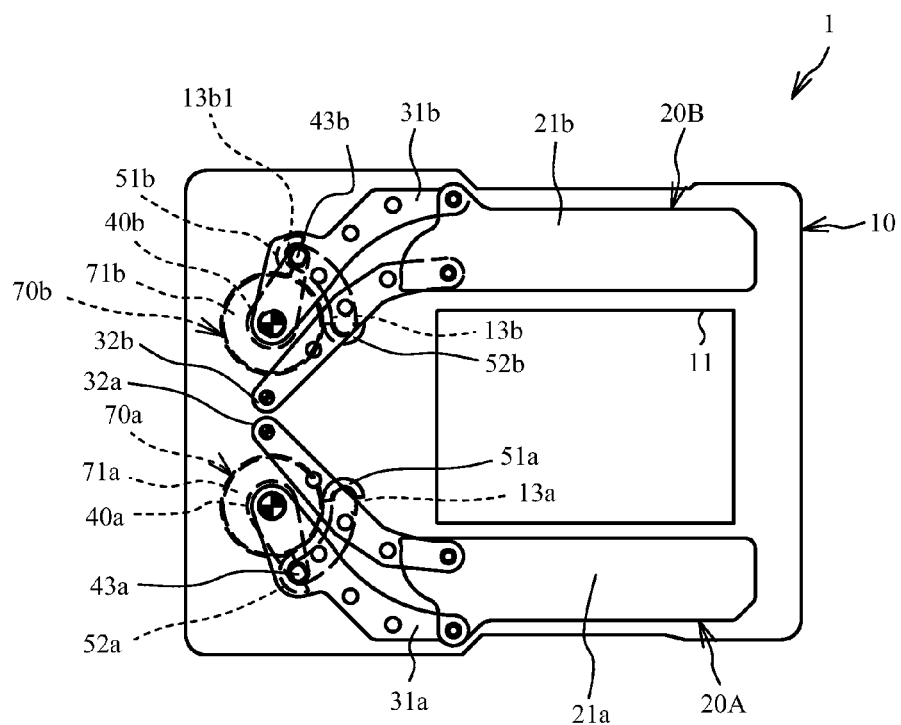
FIG. 1A is a front view of a focal plane shutter according to the present embodiment.

In the following, the embodiment will be described with reference to drawings. FIG. 1A is a front view of a focal plane shutter 1 according to the present embodiment. The focal plane shutter 1 includes: a board 10 including an opening 11; a leading shutter 20A and a trailing shutter 20B opening and closing the opening 11; an arm 31a and an assist arm 32a for driving the leading shutter 20A; and an arm 31b and an assist arm 32b for driving the trailing shutter 20B.

The board 10 is made of a synthetic resin, and includes the opening 11 having a rectangular shape. Although the leading shutter 20A and the trailing shutter 20B each include plural blades, blades 21a and 21b are only illustrated and other blades are omitted in FIG. 1A. Each of the blades 21a and 21b is made of a synthetic resin, and is formed into a thin shape. Further, each of the arms 31a and 31b and the assist arms 32a and 32b is made of a synthetic resin and has a thin plate shape. These arms are swingably supported by the board 10.

The focal plane shutter 1 includes a leading shutter actuator 70a (hereinafter, referred to as actuator) and a trailing shutter actuator 70b (hereinafter, referred to as actuator) as respective drive sources driving the leading shutter 20A and the trailing shutter 20B. The actuators 70a and 70b respectively include rotors 71a and 71b that are rotatable within a predetermined range in both directions. The actuators 70a and 70b will be described later in detail. The rotors 71a and 71b are respectively secured with a leading shutter drive lever (hereinafter referred to as a drive lever) 40a and a trailing shutter drive lever (hereinafter referred to as a drive lever) 40b serving as drive members.

The rotation of the rotor 71a causes the drive lever 40a to swing within a predetermined range. The drive lever 40a is formed with a drive pin 43a at its end. The drive pin 43a is fitted into a fitting hole of the arm 31a. Further, the board 10 is formed with a leading shutter escape slot (hereinafter referred to as escape slot) 13a releasing the drive pin 43a and having an arc shape. The abutment of the drive pin 43a with an end portion of the escape slot 13a restricts the swingable range of the drive lever 40a.

One end and the other end of the escape slot 13a are respectively provided with buffering members 51a and 52a. The drive pin 43a of the drive lever 40a abuts with the buffering member 51a or 52a, thereby suppressing the drive lever 40a from bounding. In the state where the leading shutter 20A recedes away from the opening 11, the drive pin 43a of the drive lever 40a abuts with the buffering member 52a. In the state where the leading shutter 20A closes the opening 11, the drive pin 43a of the drive lever 40a abuts with the buffering member 51a.

Figure 1B:
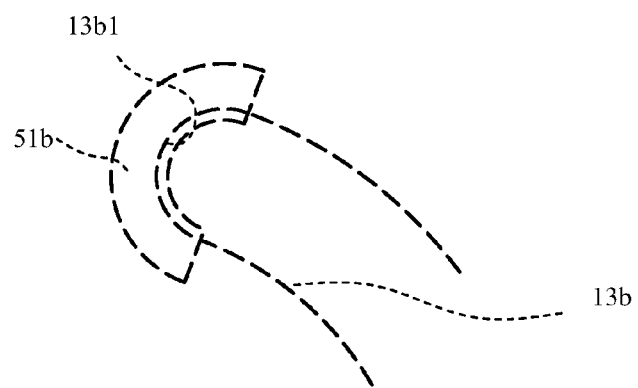
FIG. 1B is an enlarged view around one end of an escape slot.

Likewise, the drive lever 40b includes a drive pin 43b fitting into a fitting hole of the arm 31b. One end 13b1 and the other end of a trailing shutter escape slot (hereinafter referred to as escape slot) 13b are respectively provided with buffering members 51b and 52b. FIG. 1B is an enlarged view around the one end 13b1 of the escape slot 13b. Additionally, the drive lever 40b is omitted in FIG. 1B. In the state where the trailing shutter 20B recedes from the opening 11, the drive pin 43b of the drive lever 40b abuts with the buffering member 51b. In the state where the trailing shutter 20B closes the opening 11, the drive pin 43b of the drive lever 40b abuts with the buffering member 52b. The buffering members 51a, 52a, 51b, and 52b are each made of rubber in the present embodiment. However, these members may be made of another material such as silicon having elasticity.

For example, in continuous shooting, the drive levers 40a and 40b reciprocate within a predetermined range in a short period. For this reason, both ends of the escape slots 13a and 13b are respectively provided with such buffering members, so the impact of the drive levers 40a and 40b can be absorbed.

With the above configuration, the rotation of the rotor 71a causes the drive lever 40a to swing, thereby enabling the arm 31a to swing. Therefore, the leading shutter 20A moves to open or close the opening 11. Likewise, the rotation of the rotor 71b causes the drive lever 40b to swing, thereby enabling the arm 31b to swing. Therefore, the trailing shutter 20B moves to open or close the opening 11.

Thus, the escape slots 13a and 13b respectively restrict the swingable ranges of the drive levers 40a and 40b. That is, the escape slots 13a and 13b restrict the rotational ranges of the rotors 71a and 71b. This restricts the reciprocating movement ranges of the leading shutter 20A and the trailing shutter 20B. The escape slots 13a and 13b are examples of restriction portions. In the fully opened state, the drive pins 43a and 43b of the drive levers 40a and 40b respectively abut with the buffering members 52a and 51b, so the escape slot 13a restricts the drive lever 40a and the rotor 71a from swinging clockwise from the fully opened state illustrated in FIG. 1. The escape slot 13b restricts the drive lever 40b and the rotor 71b from swinging counterclockwise from the fully opened state illustrated in FIG. 1. Therefore, in the fully opened state illustrated in FIG. 1, the leading shutter 20A and the trailing shutter 20B are restricted from further moving in the directions away from the opening 11.

Figure 2:
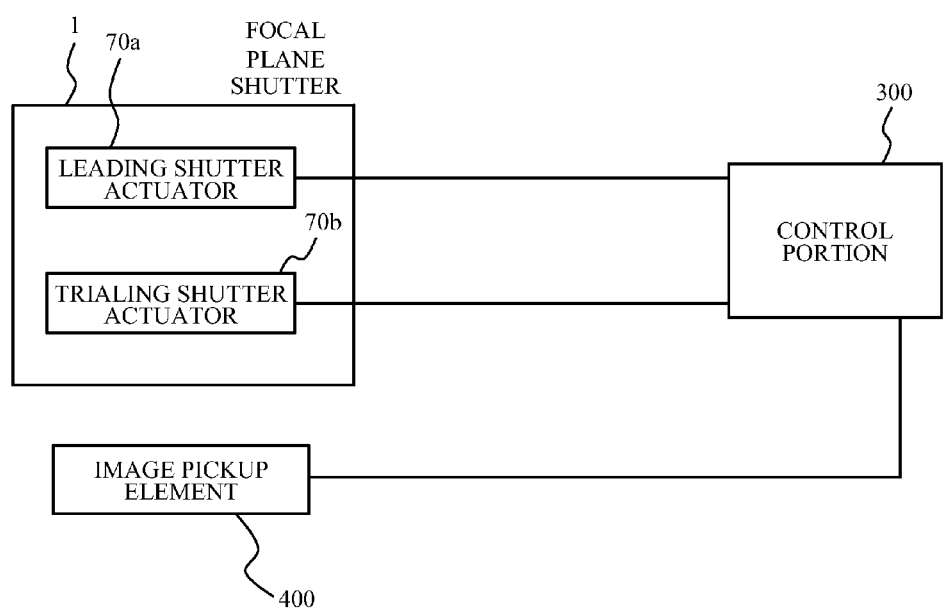
FIG. 2 is a block diagram of a camera including the focal plane shutter.

A description will be given of a configuration of a camera equipped with the focal plane shutter 1. FIG. 2 is a block diagram of the camera equipped with the focal plane shutter 1. The camera includes: the focal plane shutter 1; a control portion 300; and an image pickup element 400. The control portion 300 controls an operation of the whole camera and includes a CPU, a ROM, and a RAM. Additionally, the camera includes lenses, not illustrated in FIG. 2, for adjusting a focal length.

The control portion 300 controls energization states of the coils of the actuators 70a and 70b. The control portion 300 is an example of a drive control portion. The image pickup element 400 changes an object image formed by the light passing through the opening 11 into electric signals. The image pickup element 400 is, for example, a CCD or a CMOS.

Additionally, there is not provided a set member for respectively positioning the leading shutter 20A and the trailing shutter 20B at charging positions. This is because the leading shutter 20A and the trailing shutter 20B can be positioned at the charging positions by the rotors 71a and 71b that are rotatable in both directions.

Figure 3A:
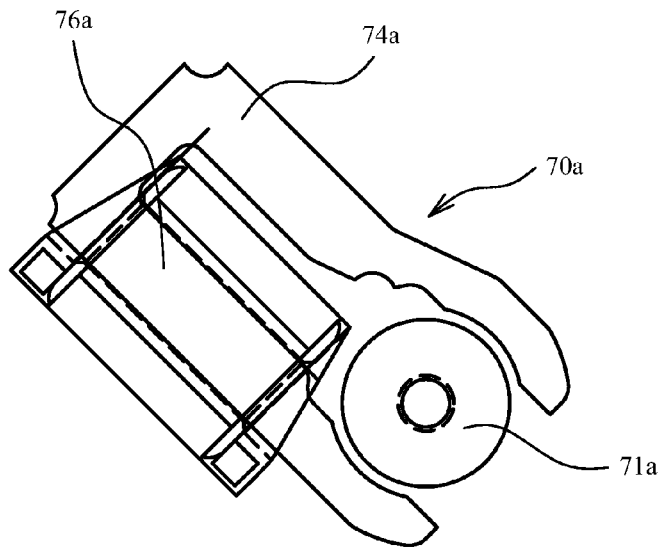
FIGS. 3A and 3B are explanatory views of a leading shutter actuator and a trailing shutter actuator, respectively.
Figure 3B:
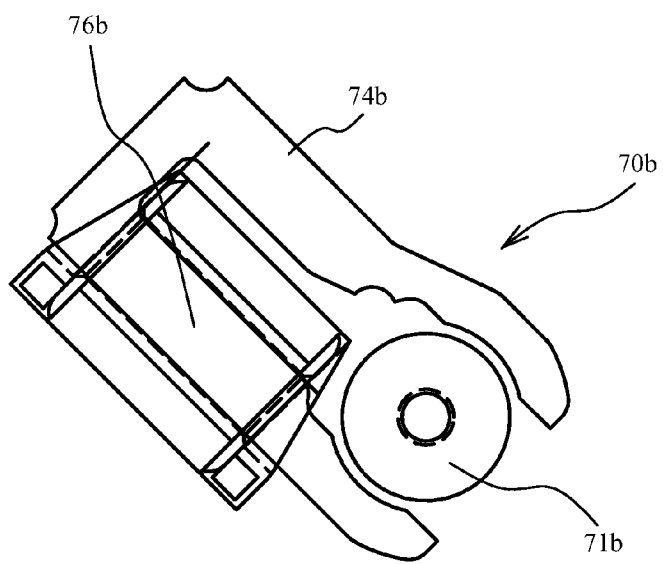

FIGS. 3A and 3B are explanatory views of the actuators 70a and 70b respectively. The actuators 70a and 70b are supported by the board 10. The actuators 70a and 70b respectively drive the drive levers 40a and 40b. The actuator 70a includes: a rotor 71a rotatably supported by the board 10; a stator 74a excited to generate a magnetic force between the stator 74a and the rotor 71a; and a coil 76a for exciting the stator 74a. The rotor 71a is a permanent magnet which is magnetized to have different polarities in a circumferential direction. A rotational axis of the rotor 71a is connected to the spindle of the drive lever 40a. Thus, the energization of the coil 76a rotates the rotor 71a, and then the leading shutter drive lever 40a rotates. The rotation of the drive lever 40a moves the leading shutter 20A. Also, the reverse energization of the coil 76a reversely rotates the rotor 71a, and then the leading shutter 20A moves in the direction opposite to the above mentioned direction. Likewise, in the actuator 70b, the energization of a coil 76b rotates a rotor 71b of the actuator 70b so as to rotate the drive lever 40b, and then the trailing shutter 20B moves. Also, the reverse energization of the coil 76b moves the trailing shutter 20B in the direction opposite to the above mentioned direction. Additionally, the rotor 71a and the drive lever 40a may be indirectly connected to each other through a gear. That is, the drive lever 40a has only to rotate in response to the rotation of the rotor 71a.

Next, a description will be given of the operation of the focal plane shutter 1. FIG. 4 is a timing chart of the focal plane shutter 1. FIG. 1A illustrates an initial state of the focal plane shutter 1. In the initial state, as illustrated in FIG. 1A, the leading shutter 20A and the trailing shutter 20B recedes away from the opening 11.

Figure 5:
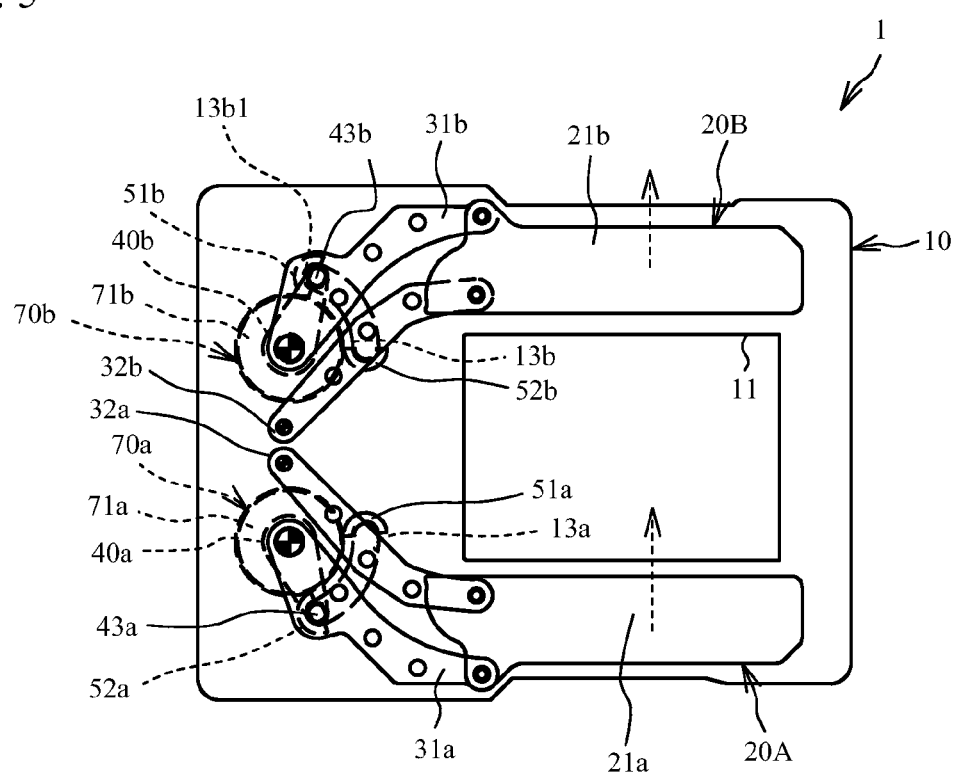
FIG. 5 illustrates a state where charging operation starts.

A release button of the camera is pushed to start a charging operation. When the charging operation starts, the coil 76a of the actuator 70a is energized, so the leading shutter 20A moves to close the opening 11. The control portion 300 energizes the coil 76b of the actuator 70b so as to maintain the trailing shutter 20B at the position receding from the opening 11 (b1), while the leading shutter 20A is moving in the charging operation. That is, the coil 76b of the actuator 70b is energized such that the trailing shutter 20B receding from the opening 11 tries to further move in the direction away from the opening 11, that is, in such a direction as to restrict the movement of the trailing shutter 20B. Therefore, the drive pin 43b of the drive lever 40b is urged against the buffering member 51b. This prevents the positional displacement of the trailing shutter 20B caused by the vibration generated by the charging operation of the leading shutter 20A. FIG. 5 illustrates a state just after the charging operation starts.

Figure 6:
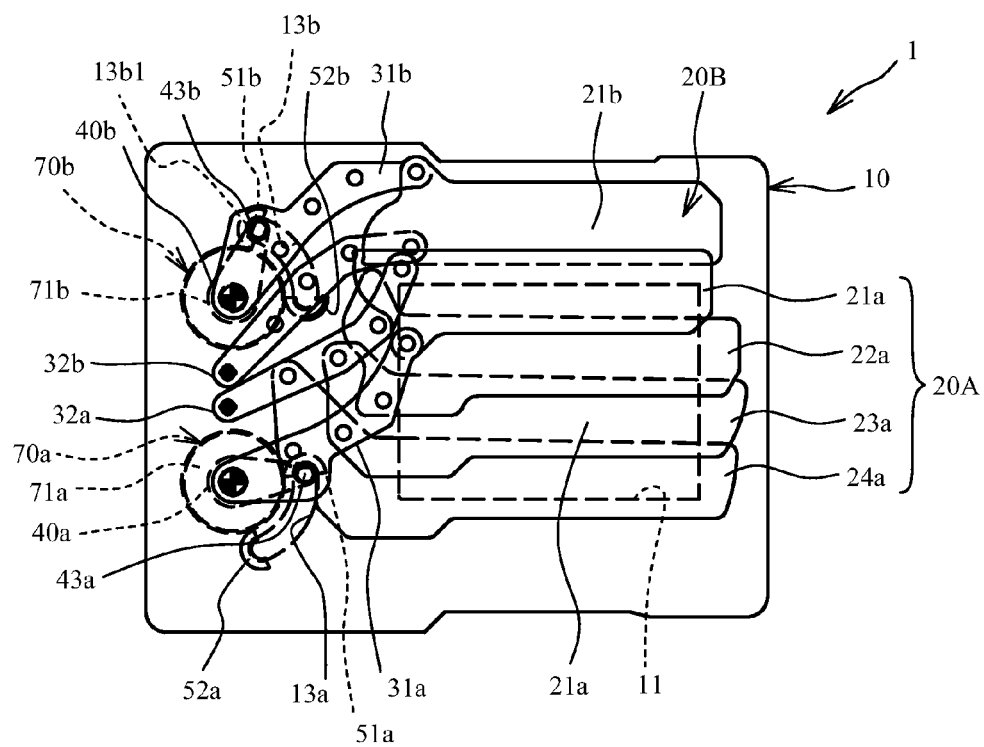
FIG. 6 illustrates a state of the focal plane shutter in a state where the charging operation finishes.

After that, the energization of the coils 76a and 76b of the actuators 70a and 70b is stopped in the state where the leading shutter 20A closes the opening 11 and the trailing shutter 20B are positioned away from the opening 11. In such a way, the charging operation is finished. FIG. 6 illustrates the focal plane shutter 1 in the state where the charging operation is finished. In addition, the blades 21a to 24a are included in the leading shutter 20A are illustrated in FIG. 6.

When a predetermined rest period elapses after the charging operation, an exposure operation starts. When the exposure operation starts, the coil 76a of the actuator 70a is energized, and the leading shutter 20A moves to open the opening 11. After a predetermined period elapses from the time when the coil 76a of the actuator 70a is energized, the coil 76b of the actuator 70b is energized, so the trailing shutter 20B moves to close the opening 11. When the leading shutter 20A moves fully away from the opening 11 and the trailing shutter 20B fully closes the opening 11, the energization of the coils 76a and 76b of the actuators 70a and 70b are stopped. In such a way, the exposure operation is finished. A period from the time when the leading shutter 20A starts moving to open the opening 11 to the time when the trailing shutter 20B fully closes the opening 11 is referred to as an exposure period.

After the exposure operation is finished, the image data are read from the image pickup element 400 by the RAM of the control portion 300 or memory of the camera side. Next, the coil 76b of the actuator 70b is energized, and the trailing shutter 20B moves away from the opening 11. Thus, the state returns to the initial state illustrated in FIG. 1A.

Herein, the control portion 300 additionally energizes the coil 76a of the actuator 70a such that the leading shutter 20A tries to move in such a direction as to restrict the movement thereof (a1), while the trailing shutter 20B is moving away from the opening 11 after the exposure operation finishes. That is, since the leading shutter 20A is positioned away from the opening 11 after the exposure operation finishes, the energization is performed such that the drive lever 40a and the rotor 71a try to further rotate and the leading shutter 20A tries to move away from the opening 11. Even when the coil 76a of the actuator 70a is energized, the leading shutter 20A is maintained in the stopped state. That is, the coil 76a of the actuator 70a is energized not to contribute to the movement of the leading shutter 20A. Here, the additional energization of the coil 76a does not adversely influence the shooting operation.

The additional energization of the coil 76a suppresses a difference in the energization period between the coils 76a and 76b during the shooting operation period for shooting a single image. It is thus possible to suppress a difference in the heat generation amount between the coils 76a and 76b. If there is a large difference in the energization period between the coils 76a and 76b during the shooting operation period for shooting a single image, a difference in the heat generation amount between the coils 76a and 76b increases, and a difference in the temperature also increases. This increases a difference in the resistance value between the coils 76a and 76b, which increases a difference in the rotating speed between the rotors 71a and 71b. Accordingly, a difference in the moving speed between the leading shutter 20A and the trailing shutter 20B increases, which might influence the image quality. In particular, in a case of continuously shooting plural images, the difference in the heat generation amount between the coils 76a and 76b might further increase, so the difference in the moving speed between the leading shutter 20A and the trailing shutter 20B might further increase.

In the present embodiment, during the charging operation, the coil 76a of the actuator 70a is energized to drive the leading shutter 20A and the coil 76b of the actuator 70b is also energized to prevent the positional displacement of the trailing shutter 20B (b1). Thus, after the leading shutter 20A and the trailing shutter 20B moves and the exposure operation finishes, while the trailing shutter 20B is moving away from the opening 11, the coil 76a is additionally energized so as to reduce the difference in the energization period between the coils 76a and 76b (a1). This suppresses the difference in the temperature between the coils 76a and 76b during the shooting operation period for shooting a single image, thereby also suppressing the increase in the difference in the temperature in the continuous shooting. Consequently, it is possible to suppress the increases in the difference in the moving speed between the leading shutter 20A and the trailing shutter 20B.

Additionally, the shooting operation period for shooting a single image means a period while the leading shutter 20A and the trailing shutter 20B drive to shoot a single image. In the present embodiment, the shooting operation period means a period during the fully opened state of fully opening the opening 11 is shifted to the fully opened state again through the charging operation and through the exposure operation.

In addition, the focal plane shutter 1 according to the present embodiment is a normally open type in which the opening 11 is maintained fully opened in the initial state. Thus, the camera according to the present embodiment is capable of displaying the moving images from the image pickup element 400 on a monitor or the like in a real-time manner.

Further, the energization periods of the coils 76a and 76b may not be the same, during the shooting operation period for shooting a single image. Furthermore, values of current or voltage applied to the coils 76a and 76b, diameters, lengths, or resistance values of the coils 76a and 76b may be different.

Herein, the heat generation amount of the actuator differs depending on conditions such as a value of current applied to the coil, a diameter of the coil, a length, a resistance value, and in addition to the energization period of the coil. Herein, the heat generation amount of the coil increases as the energization period of the coil increases. The heat generation amount of the coil increases as the value of current applied to the coil increases. The heat generation amount of the coil decreases as the diameter of the coil increases. The heat generation amount of the coil increases as the length of the coil increases. The heat generation amount of the coil increases as the resistance value of the coil increases.

For example, in a case where the coils 76a and 76b are the same in conditions other than the current value and where the value of current applied to the coil 76b is greater than that of current applied to the coil 76a, a total energization period while the coil 76b is energized may be shorter than a total energization period while the coil 76a is energized. For example, in a case where the coils 76a and 76b are the same in conditions other than the current value and where the value of current applied to the coil 76b is smaller than that of current applied to the coil 76a, the total energization period while the coil 76b is energized may be longer than the total energization period while the coil 76a is energized.

For example, in experiment, the temperatures of the coils 76a and 76b are detected after the continuous shooting finishes, one of the coils 76a and 76b having a lower temperature may be additionally energized. Thus, the additional energization of the coil 76b may suppress the difference in the heat generation amount between the coils 76a and 76b. In a case where the coil 76b is additionally energized, the actuator 70b is additionally energized such that the trailing shutter 20B tries to move in such a direction as to restrict its movement in the state where the trailing shutter 20B fully recedes from the opening 11 or fully closes the opening 11. For example, when the trailing shutter 20B recedes from the opening 11 as illustrated in FIG. 1, the actuator 70b is additionally energized such that the rotor 71b and the drive lever 40b try to rotate counterclockwise. Further, when the trailing shutter 20B closes the opening 11, the actuator 70b is additionally energized such that the rotor 71b and the drive lever 40b try to rotate clockwise.

Figure 7:
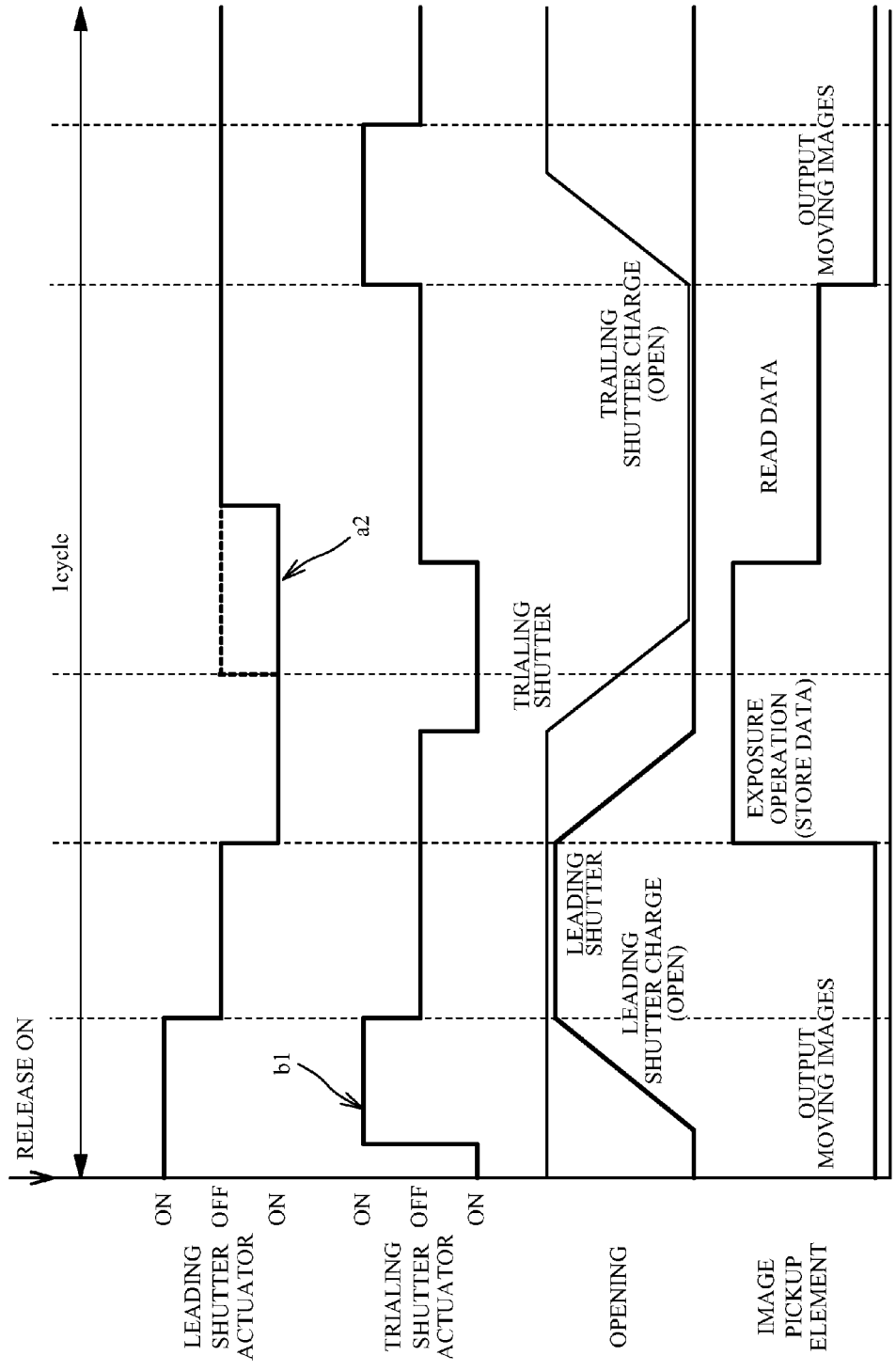
FIG. 7 is a timing chart according to a first variation.

FIG. 7 is a timing chart according to the first variation. Subsequently to the energization for performing the exposure operation, the coil 76a of the actuator 70a is additionally energized (a2), even after the leading shutter 20A stops.

Specifically, in the exposure operation, the leading shutter 20A moves from a position to close the opening 11 to a position to recede from the opening 11, and then stops. In such a time, the coil 76a may be additionally energized. Also, the coil 76a is continuously energized for a predetermined period after the leading shutter 20A stops, thereby suppressing the bounce occurring when the drive lever 40a swings and the drive pin 43a abuts with the buffering member 52a.

Figure 8:
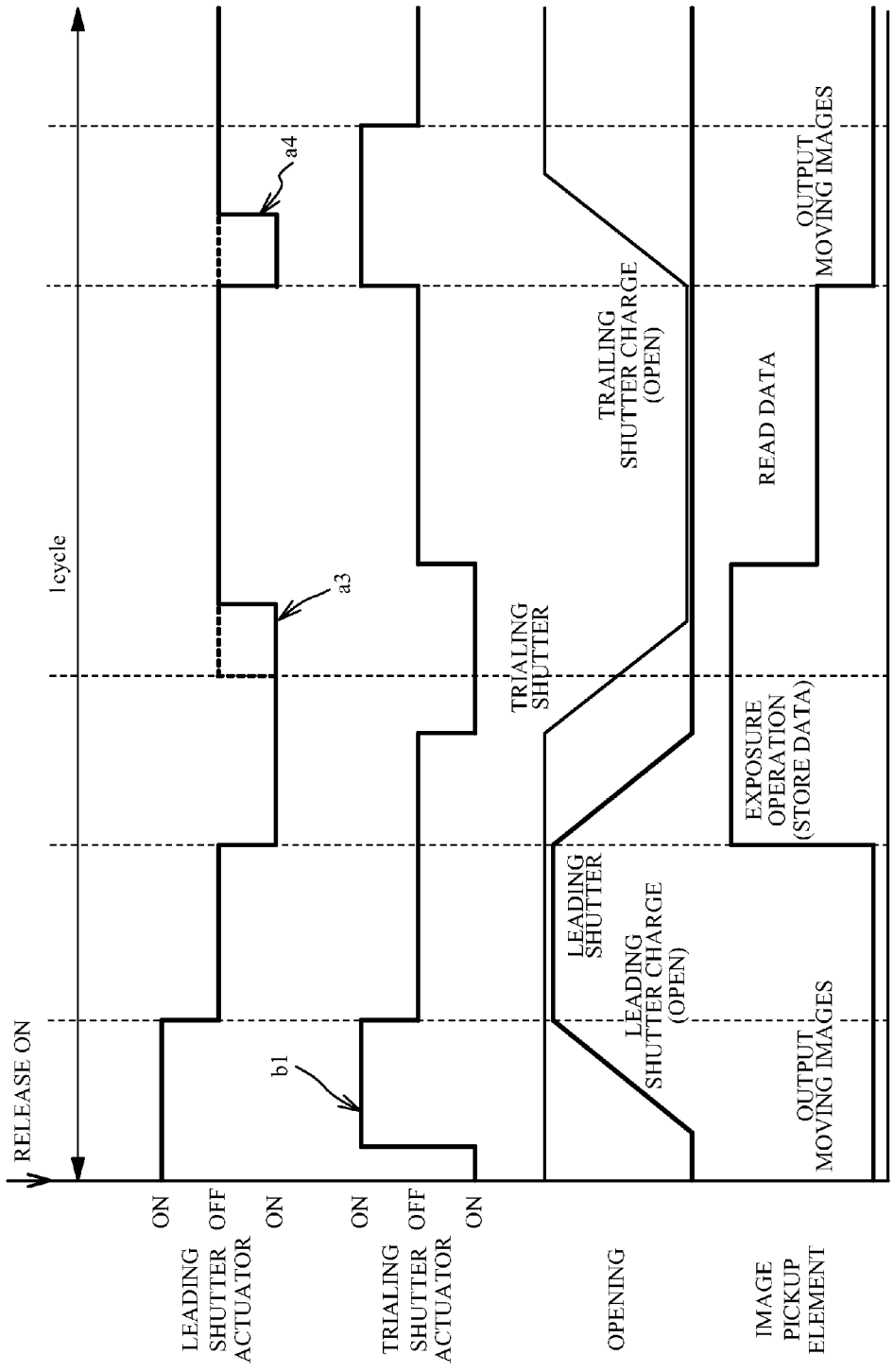
FIG. 8 is a timing chart according to a second variation.

FIG. 8 is a timing chart according to the second variation. The coil 76a is additionally energized subsequently to the energization for performing the exposure operation (a3), and the coil 76a is also additionally energized while the trailing shutter 20B is moving after the exposure operation finishes (a4). In this way, the coil 76a may be additionally energized several times. The coil 76a may be additionally energized three times or more.

Also, in the focal plane shutter of the normally open type, the coil 76a may be additionally energized, subsequently to the energization of the coil 76a to move the leading shutter 20A in the charging operation before the exposure operation. In this case, it is possible to suppress the bounce when the leading shutter 20A stops in the charging operation before the exposure operation.

Figure 9:
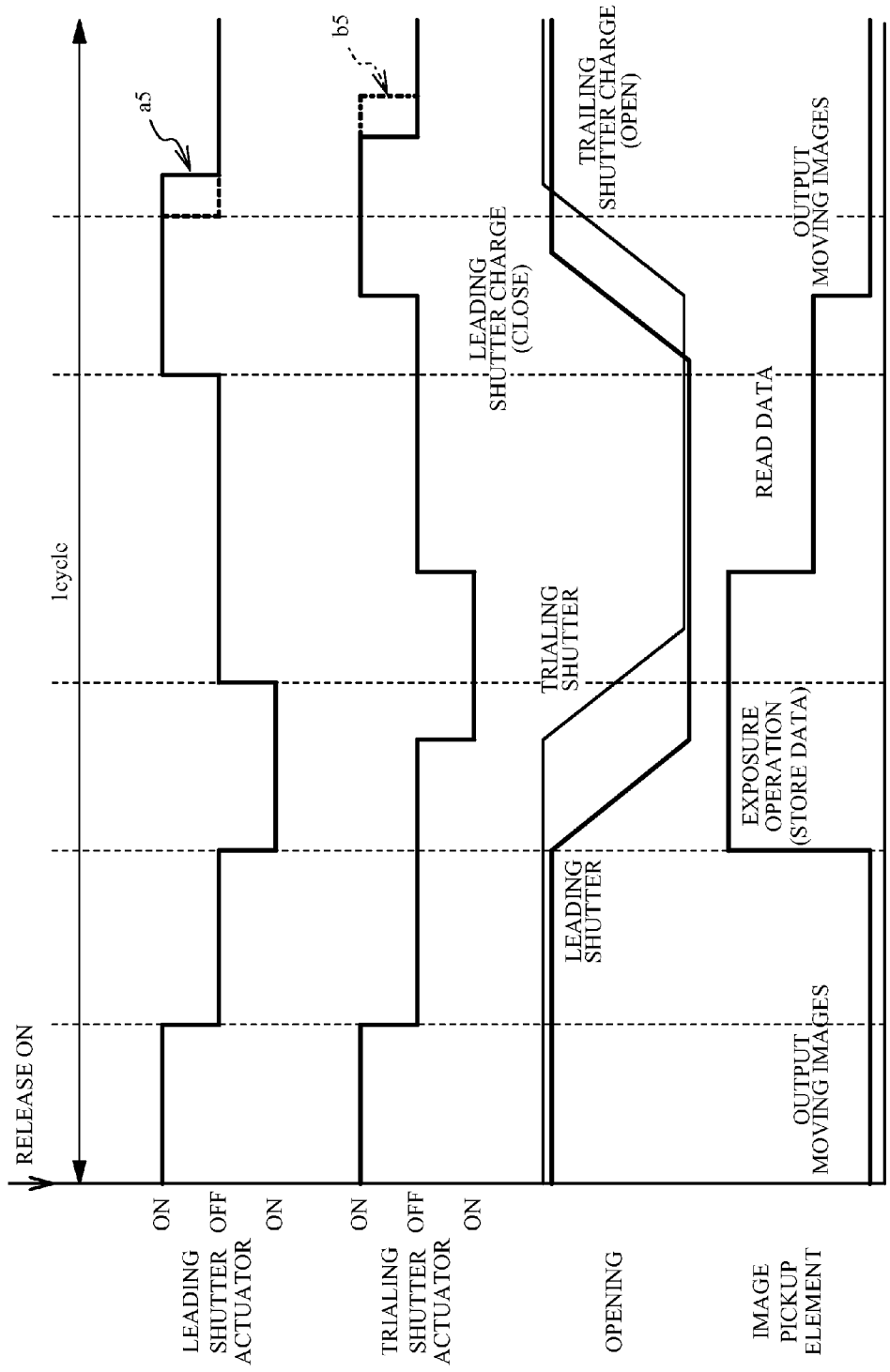
FIG. 9 is a timing chart according to a third variation.

FIG. 9 is a timing chart according to the third variation. In the timing chart according to the third variation, a focal plane shutter of a normally closed type in which the opening 11 is closed in the initial state is employed. In this case, the exposure operation is performed from the state where the opening 11 is closed. After the exposure operation, the leading shutter 20A and the trailing shutter 20B move while the opening 11 is maintained in the fully closed state, and then the initial state is returned.

As described above, the heat generation amount of the actuator differs depending on conditions such as a value of current applied to the coil, a diameter of the coil, a length, a resistance value, and in addition to the energization period of the coil. For example, in a case where different values of current are applied to the coils 76a and 76b, even if the energization period of each coil is the same, a difference in the heat generation amount between the actuators 70a and 70b occurs. FIG. 9 illustrates a case where the coil 76a is additionally energized so as to move the leading shutter 20A (a5) or the coil 76b is additionally energized so as to move the trailing shutter 20B (b5) while the leading shutter 20A and the trailing shutter 20B move to be returned to the initial state. In FIG. 9, the case where the coil 76a is additionally energized (a5) is represented by a solid line, and the case where the coil 76b is additionally energized (b5) is represented by a dotted line. On the basis of data about the temperatures of the coils 76a and 76b obtained, for example, in experiment after the continuous shooting operation finishes, it can be determined which coil is additionally energized and how long is the energization period. In this case, the additional energization is also performed so as to reduce the difference in the heat generation amount between the actuators 70a and 70b during the exposure operation period for shooting a single image.

Additionally, the above embodiment has described an example where the coil 76a or 76b is additionally energized while the leading shutter 20A and the trailing shutter 20B are moving to the initial state. However, the timing of the additional energization is not limited to this.

While the exemplary embodiments of the present invention have been illustrated in detail, the present invention is not limited to the above-mentioned embodiments, and other embodiments, variations and modifications may be made without departing from the scope of the present invention.

The focal plane shutter according to the present embodiment is applicable to optical apparatuses such as still cameras, and digital cameras.

Also, the above embodiment has described the blades and the arms which are thin and made of a synthetic resin. However, they may have thin plate shapes made of metal. In the above embodiment, each of the leading shutter and the trailing shutter each includes four blades, but is not limited to this. Each of the leading shutter and the trailing shutter may include from two to five blades.

Finally, several aspects of the present invention are summarized as follows.

According to an aspect of the present invention, there is provided an imaging device including: a focal plane shutter including: a board including an opening; a leading shutter and a trailing shutter opening and closing the opening; a leading shutter actuator and a trailing shutter actuator respectively driving the leading shutter and the trailing shutter; and a restrict portion that restricts reciprocating movement ranges of the leading shutter and the trailing shutter, an image pickup element which light enters through the opening; and a drive control portion that additionally energizes one of the leading shutter actuator and the trailing shutter actuator such that one of the leading shutter and the trailing shutter tries to move in a direction when the restriction portion restricts the one of the leading shutter and the trailing shutter from moving in the direction, to suppress a difference in heat generation amount between the leading shutter actuator and the trailing shutter actuator during a shooting operation period for shooting a single image.

According to another aspect of the present invention, there is provided a focal plane shutter including: a board including an opening; a leading shutter and a trailing shutter opening and closing the opening; a leading shutter actuator and a trailing shutter actuator respectively driving the leading shutter and the trailing shutter; and a restrict portion that restricts reciprocating movement ranges of the leading shutter and the trailing shutter, wherein one of the leading shutter actuator and the trailing shutter actuator is additionally energized such that one of the leading shutter and the trailing shutter tries to move in a direction when the restriction portion restricts the one of the leading shutter and the trailing shutter from moving in the direction, to suppress a difference in heat generation amount between the leading shutter actuator and the trailing shutter actuator during a shooting operation period for shooting a single image.

What is claimed is:
1. An imaging device comprising:
a focal plane shutter including:
a board including an opening;
a leading shutter and a trailing shutter opening and closing the opening;
a leading shutter actuator and a trailing shutter actuator respectively driving the leading shutter and the trailing shutter;
a leading shutter drive lever driving the leading shutter and rotated by the leading shutter actuator;
a trailing shutter drive lever driving the trailing shutter and rotated by the trailing shutter actuator;
a restriction portion that restricts reciprocating movement ranges of the leading shutter and the trailing shutter through physical contact;
an image pickup element which light enters through the opening; and a drive control portion that is configured to additionally energize one of the leading shutter actuator and the trailing shutter actuator such that one of the leading shutter and the trailing shutter tries to move in a direction when the restriction portion restricts the one of the leading shutter and the trailing shutter from moving in the direction, to suppress a difference in heat generation amount between the leading shutter actuator and the trailing shutter actuator during a shooting operation period for shooting a single image, wherein the restriction portion comprises a leading shutter escape slot restricting a rotational range of the leading shutter drive lever and a trailing shutter escape slot restricting a rotational range of the trailing shutter drive lever.

2. The imaging device of claim 1, wherein the drive control portion additionally energizes the one of the leading shutter actuator and the trailing shutter actuator so as to suppress a difference in energization period between the leading shutter actuator and the trailing shutter actuator during the shooting operation period.

3. The imaging device of claim 1, wherein, even after the one of the leading shutter and the trailing shutter stops, the drive control portion additionally energizes the one of the leading shutter actuator and the trailing shutter actuator, subsequently to energization for moving the one of the leading shutter and the trailing shutter.

4. The imaging device of claim 1, wherein the one of the leading shutter actuator and the trailing shutter actuator is additionally energized while the other one of the leading shutter and the trailing shutter is moving.

5. A focal plane shutter comprising:
a board including an opening;
a leading shutter and a trailing shutter opening and closing the opening;
a leading shutter actuator and a trailing shutter actuator respectively driving the leading shutter and the trailing shutter;
a leading shutter drive lever driving the leading shutter and rotated by the leading shutter actuator;
a trailing shutter drive lever driving the trailing shutter and rotated by the trailing shutter actuator; and
a restriction portion that restricts reciprocating movement ranges of the leading shutter and the trailing shutter through physical contact, wherein one of the leading shutter actuator and the trailing shutter actuator is configured to be additionally energized such that one of the leading shutter and the trailing shutter tries to move in a direction when the restriction portion restricts the one of the leading shutter and the trailing shutter from moving in the direction, to suppress a difference in heat generation amount between the leading shutter actuator and the trailing shutter actuator during a shooting operation period for shooting a single image, and wherein the restriction portion comprises a leading shutter escape slot restricting a rotational range of the leading shutter drive lever and a trailing shutter escape slot restricting a rotational range of the trailing shutter drive lever.

6. An imaging device comprising:
a focal plane shutter including:
a board including an opening;
a leading shutter and a trailing shutter opening and closing the opening;
a leading shutter actuator and a trailing shutter actuator respectively driving the leading shutter and the trailing shutter; and
a restriction portion that restricts reciprocating movement ranges of the leading shutter and the trailing shutter through physical contact;
an image pickup element which light enters through the opening; and
a drive control portion that is configured to additionally energize one of the leading shutter actuator and the trailing shutter actuator such that one of the leading shutter and the trailing shutter tries to move in a direction when the restriction portion restricts the one of the leading shutter and the trailing shutter from moving in the direction, to suppress a difference in heat generation amount between the leading shutter actuator and the trailing shutter actuator during a shooting operation period for shooting a single image, wherein when the drive control portion additionally energizes the one of the leading shutter actuator and the trailing shutter actuator, the other of the leading shutter actuator and the trailing shutter actuator is moving one of the leading shutter and the trailing shutter corresponding to the other of the leading shutter actuator and the trailing shutter actuator.

* * * * *